United States Patent [19]

Campbell et al.

[11] Patent Number: 5,499,287
[45] Date of Patent: Mar. 12, 1996

[54] FAX-TELEPHONE INTERFACE CIRCUIT

[75] Inventors: Alan R. Beck, Fremont; Bob Campbell, Cupertino; Curtis R. Gowan, San Jose; John D. Graf, Sunnyvale; Nandini Nayak, San Jose, all of Calif.

[73] Assignee: Hewlett-Packard Company, Palo Alto, Calif.

[21] Appl. No.: 357,049

[22] Filed: Dec. 13, 1994

Related U.S. Application Data

[63] Continuation of Ser. No. 975,416, Nov. 12, 1992, abandoned.

[51] Int. Cl.$^6$ ..................................................... H04M 1/64
[52] U.S. Cl. .............................. 379/67; 379/100; 379/201; 379/373; 379/375
[58] Field of Search .................................. 379/67, 88, 89, 379/100, 201, 372, 373, 374, 375

[56] References Cited

U.S. PATENT DOCUMENTS

| | | | |
|---|---|---|---|
| 4,596,021 | 6/1986 | Carter et al. | 379/98 |
| 4,782,518 | 11/1988 | Mattley et al. | 379/373 |
| 4,800,439 | 1/1989 | Yoshino | 379/100 |
| 4,815,121 | 3/1989 | Yoshida | 379/100 |
| 4,939,772 | 7/1990 | Goto | 379/102 |
| 4,995,075 | 2/1991 | Angiolillo-Bent et al. | 379/375 |
| 5,023,903 | 6/1991 | Bowen | 379/67 |
| 5,036,534 | 7/1991 | Gural | 379/100 |
| 5,056,132 | 10/1991 | Coleman et al. | 379/88 |
| 5,073,921 | 12/1991 | Nomura et al. | 379/88 |
| 5,077,786 | 12/1991 | Hashimoto | 379/97 |
| 5,140,630 | 8/1992 | Fry et al. | 379/373 |
| 5,142,569 | 8/1992 | Peters et al. | 379/373 |

*Primary Examiner*—Jeffery A. Hopsass
*Assistant Examiner*—Fan Tsang

[57] ABSTRACT

An improved telephone interface box which interfaces an incoming telephone line to either a modem or a telephone handset is disclosed. The choice of connection is made by a controller that answers incoming calls and determines if the call is to be directed to the modem or the telephone line. The controller determines the destination of the incoming call by detecting tones on the telephone line or by examining the response of the caller to a voice prompt. If the controller determines that the incoming call is to be directed to the telephone handset, the controller generates a ring signal having substantially the same cadence as that detected on the incoming line and sends that ring signal to the telephone handset. If the handset goes off-hook during the time the controller is making its determination as to the correct destination for the incoming call, the controller suspends its operation until the handset is placed on-hook or a predetermined time interval elapses. The controller also allows the handset to assert priority over an existing connection by rapidly depressing the off-hook switch on the handset.

3 Claims, 4 Drawing Sheets

FAX-TELEPHONE INTERFACE CIRCUIT

This is a continuation of application Ser. No. 07/975,416 filed on Nov. 12, 1992 which has been abandoned.

FIELD OF THE INVENTION

The present invention relates to telephonic communications, and more particularly, to an apparatus for interfacing a plurality of devices including a FAX machine to a single telephonic communication line.

BACKGROUND OF THE INVENTION

The significant improvements in data processing achieved over the last decade have led to the wide-spread availability of computers and FAX machines. Both computers, via modems, and FAX machines communicate over telephone lines. The simplest method for accommodating these devices utilizes separate telephone lines for each device. Hence, these devices have led to an increased demand for telephone lines. While this solution is simple to implement, the cost of installation and monthly service fees often exceeds the cost of the hardware attached to the telephone lines.

The prior art has attempted to solve this cost problem by providing an interface box which connects to a telephone line and provides separate ports for connecting voice, FAX, and modem lines. When an incoming call is received, the interface box answers the call and tries to determine the nature of the call. If the interface box detects a CNG tone, it assumes that the call is for the FAX machine and connects the incoming telephone line to the FAX port. If the interface box detects DTMF tones, it assumes that the incoming call is for a modem and connects the incoming telephone line to the modem port. If the interface box does not detect either a CNG tone or DTMF tones, the interface box assumes the incoming call is a conventional telephone call and connects the incoming telephone line to the telephone port. The interface box then generates a conventional telephone ringing signal on the telephone port until such time as the telephone connected thereto goes off hook or the calling party hangs up.

While this type of prior art interface box allows all three types of devices to be connected to an incoming telephone line, it has a number of problems. First, not all FAX machines generate CNG tones. Hence, a call from one of these FAX machines is directed to the voice port. As a result, the FAX connection is not made and the FAX will not be delivered unless a person is present to receive the call and manually direct it to the FAX machine.

Second, the "style" of the incoming ring signal is not reproduced on the voice port when the interface box determines that the incoming call is a conventional telephone call. In prior art interface boxes, a fixed ring pattern is generated on the voice port. In many telephone systems, the incoming ring pattern alerts the recipient of the type of telephone call. For example, in some PBX systems, a different ring pattern is used for outside calls then for calls from another extension on the PBX. In addition, some telephone companies provide specialized services in which call originating from a predetermined list of telephone numbers have different ring patterns. This alerts the recipient to the fact that the incoming call is from one of a select group of callers.

Third, it is difficult to regain control of the incoming telephone line in case of emergency if the interface box has connected the incoming telephone line to the FAX or modem ports. While many of these prior art interface boxes have reset switches on the interface box for this purpose, the interface box may be located at some distance from the voice handset. In addition, a user who is not familiar with the particular interface box often has difficulty determining the reset procedure. Some interface boxes are constructed on circuit cards in personal computers. In these cases, a user wishing to take control of the line must either know how to reset the particular software or cycle down the entire computer.

Fourth, if a user picks up the telephone handset while the interface box is attempting to identify a call, errors in the identification of the call type often result. This situation can arise in at least two situations. First, the user may just happen to pick up the phone to make an outgoing call during the time the interface box is attempting to identify an incoming call. Second, the user may note that an incoming call has been received and wish to intercept the call if it is a voice call to prevent the call being lost due to the delays inherent in identifying a call or an interface box malfunction.

Broadly, it is the object of the present invention to provide an improved telephone interface box for connecting an incoming telephone line to a FAX machine and voice hand set.

It is another object of the present invention to provide a telephone interface box which mimic's the ring style of the incoming telephone call when the interface box determines that the incoming call is a voice transmission.

It is a still further object of the present invention to provide a telephone interface box which may be reset without a knowledge of the location of the interface box or the details of software running the interface box.

It is yet another object of the present invention to provide a telephone interface box which does not depend on CNG tones to identify an incoming FAX transmission.

It is a still further object of the present invention to provide a telephone interface box which allows the user to pick up the handset during call identification without introducing errors into the call identification process.

These and other objects of the present invention will become apparent to those skilled in the art from the following detailed description of the invention and the accompanying drawings.

SUMMARY OF THE INVENTION

The present invention comprises a telephone interface box which interfaces an incoming telephone line to either a modem or a telephone handset. The choice of connection is made by a controller that answers incoming calls and determines if the call is to be directed to the modem or the telephone line. The controller determines the destination of the incoming call by detecting tones on the telephone line or by examining the response of the caller to a voice prompt. The controller also stores the cadence of the ring signal associated with the incoming call. If the controller determines that the incoming call is to be directed to the telephone handset, the controller generates a ring signal having substantially the same cadence as that detected on the incoming line on the telephone handset. The interface box also includes circuitry for detecting if the handset is off-hook. If the handset goes off-hook during the time the controller is making its determination as to the correct destination for the incoming call, the controller suspends its operation until the handset is placed on-hook or a predetermined time interval elapses. If the controller detects a series of off-hook pulses while the telephone line is connected to the modem, the controller terminates the connection between the telephone line and modem and then connects the handset to the incoming telephone line.

DETAILED DESCRIPTION OF THE INVENTION

Figure 1:
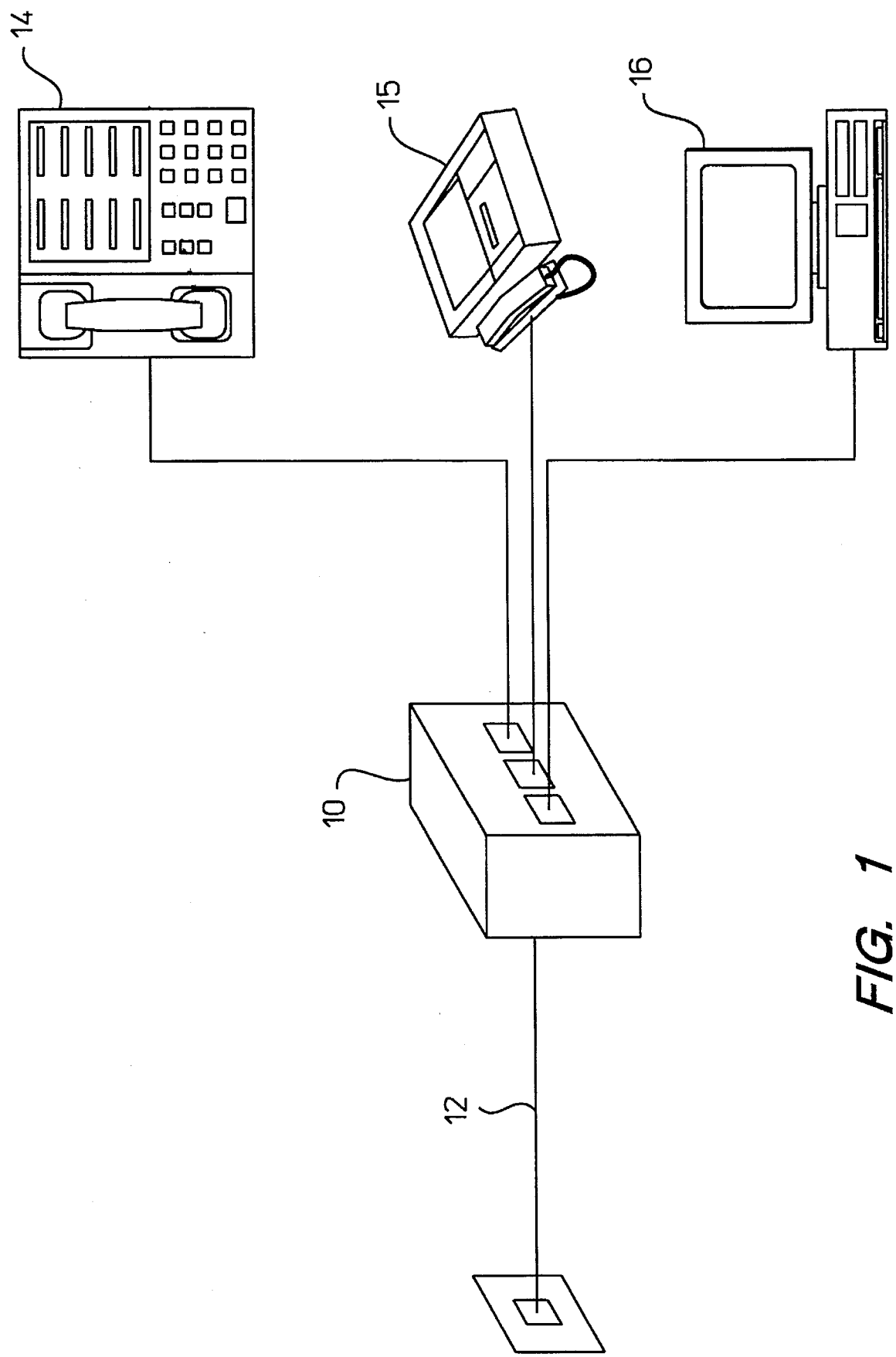
FIG. 1 illustrates the relationship between an interface box according to the present invention and several devices that are to be connected to a single telephone line.

The present invention provides a means for modems, FAX machines, and conventional telephone equipment to share the same telephone line. The present invention may be more easily understood with reference to FIGS. 1–3. An interface box 10 according to the present invention routes calls received on a telephone line 12 to either telephone 14, FAX machine 15, or computer 16 depending on the characteristics of the call. If any of the devices 14–16 goes "off-hook" and telephone line 12 is currently not being used, interface box 10 connects the device in question to telephone line 12.

Figure 2:
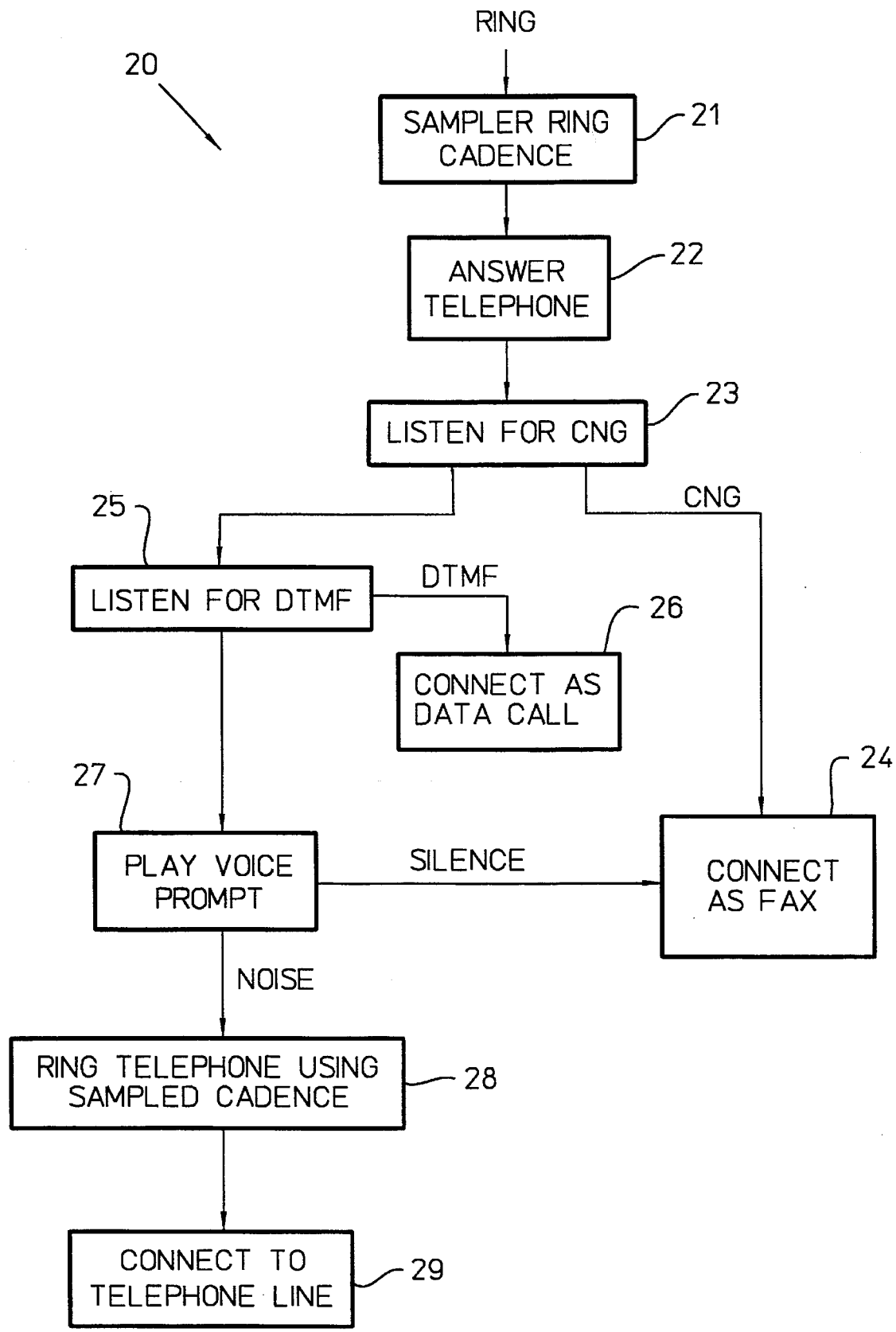
FIG. 2 is flow chart of the caller identification protocol utilized by the present invention.
Figure 3:
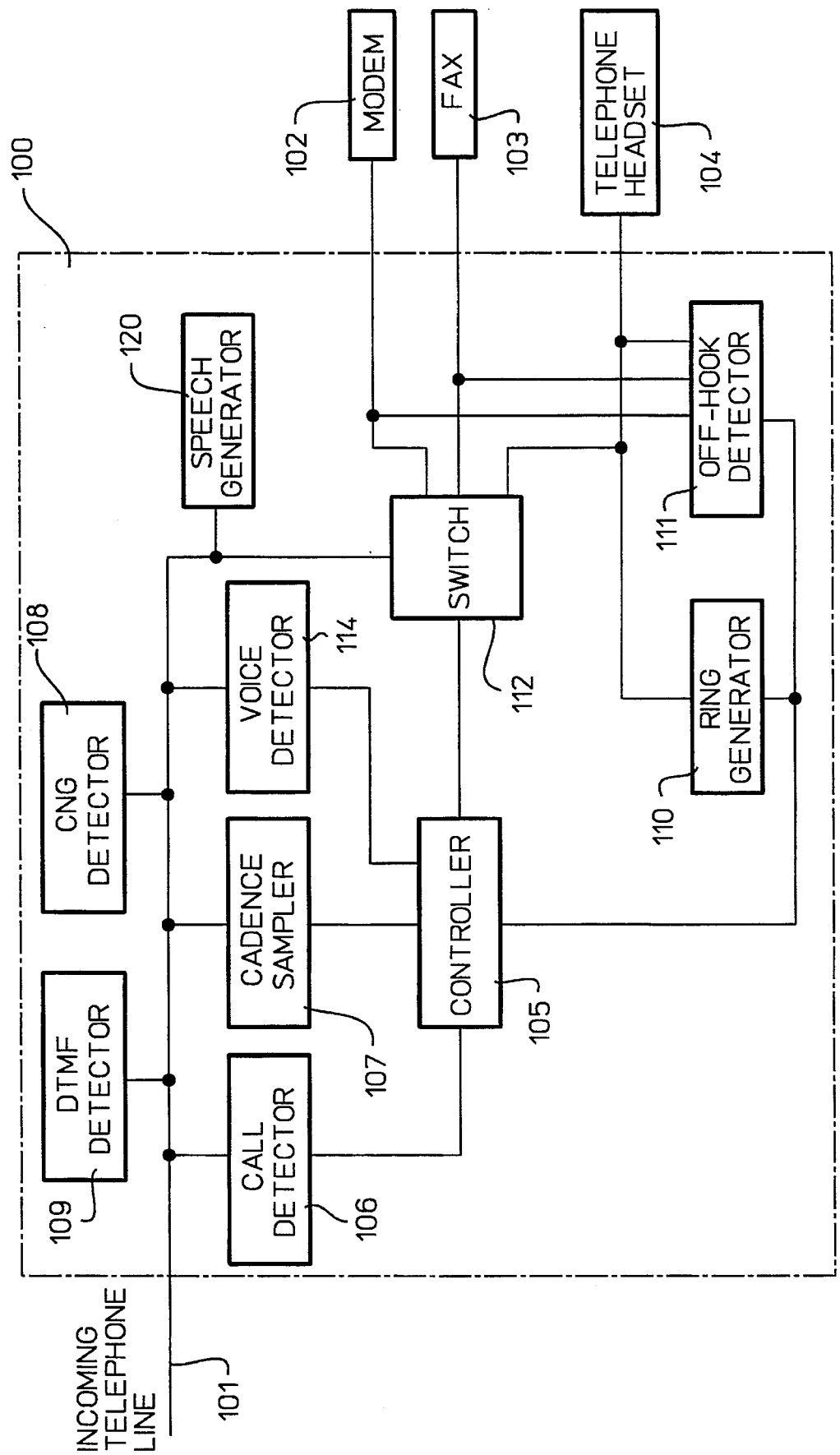
FIG. 3 is a block diagram of one embodiment of an interface device according to the present invention.

Refer now to FIGS. 2–3. FIG. 3 is a block diagram of one embodiment of an interface box 100 according to the present invention. FIG. 2 is a flow chart of the sequence of steps performed by controller 105 shown in FIG. 3 upon detecting a ring signal on incoming telephone line 101. When controller 105 detects a ring signal on line 101, controller 105 causes cadence sampler 107 to store the timing of the ring signal for later use. Controller 105 then causes call detector 106 to answer the call, i.e., to go off-hook, as shown at 22.

Controller 105 then attempts to determine the type of telephone call that is being received. There are three possibilities, a FAX transmission, a data modem transmission, or a conventional voice telephone call. Controller 105 first checks for a CNG tone as shown at 23. Many modern FAX machines transmit such a tone. Hence, if a CNG tone is detected, controller 105 causes switch 112 to connect line 101 to FAX machine 103. If a standard FAX machine is connected to interface box 100, controller 105 would also generate the required ring signal on the telephone line connecting interface box 100 to the FAX machine.

If a CNG tone is not detected, the incoming call is either a FAX machine that does not transmit a CNG tone, a modem call, or a voice call. Controller 105 next attempts to determine if the incoming call is a modem call by utilizing DTMF tone detector 109 to listen for DTMF tones on line 101. If a DTMF tone is detected, controller 105 causes switch 1!2 to connect line 101 to modem 102 as shown at 26. If a separate modem is connected, a ring signal would then be generated on the telephone line connecting interface box 100 to the modem.

If neither a CNG or DTMF tone is detected within a predetermined time interval, controller 105 assumes that the incoming call is either a voice communication or a FAX machine that does not transmit a CNG tone. To resolve this ambiguity, controller 105 causes speech generator 120 to transmit a message on line 101 to the caller as shown at 27.

Any message that will elicit a voice response from the caller if the telephone call is a voice communication will suffice for this purpose. For example, the message could ask for the caller name. Controller 105 then utilizes voice detector 114 to determine if a response to the message is given. If no response is received, controller 105 assumes the call is from a non-CNG transmitting FAX machine and causes switch 112 to connect line 101 to FAX machine 103 and generates any ring signal needed to activate the FAX machine.

If controller 105 detects any response to the voice prompt, controller 105 assumes that the incoming call is a voice communication. Controller 105 then generates a message instructing the caller to stay on the line. Controller 105 then connects line 101 to telephone head set 104 and causes ring generator 110 to generate a ring signal. The ring signal uses the same cadence as that stored by cadence sampler 107. In addition, a ring signal is transmitted on line 101 to the caller to simulate the sounds expected by the caller prior to telephone head set 104 being answered. When telephone head set 104 goes off-hook, controller 105 connects the handset to line 101 and terminates the ring signals.

The presence of off-hook detector 111 also allows the present invention to provide solutions to two additional problems mentioned above with regard to prior art interface systems. Controller 105 allows a user of telephone handset 104 to interrupt either its operation or that of FAX machine 103 or modem 102. Consider the case in which a telephone user must gain access to line 101 for an emergency call, but line 101 is being used by FAX 103 or modem 102. In prior art interface systems, the user must access the interface box to reset the same in order to regain control of telephone line 101. However, the location of the interface box is not always near telephone handset 104. Furthermore, a user who is not familiar with the particular interface box may have difficulty in determining the sequence of operations needed to reset the interface box.

In an interface box according to the present invention, controller 105 monitors off-hook detector 111 even during those periods in which telephone line 101 is connected to either FAX machine 103 or modem 102. If controller 105 detects a sequence of rapid off-hook signals from telephone handset 104, controller 105 disconnects the currently connected device from line 101 and then connects handset 104 to line 101. The sequence of off-hook signals is the type of sequence generated by a telephone user when the user rapidly depresses and releases the on-hook switch button on a conventional telephone set. This action does not require any special knowledge of the location of the interface box or its reset procedure. In addition, this action is the natural response of many telephone users when they pick up a telephone handset and do not hear a dial tone.

As noted above, there are also situations in which a telephone user lifts the receiver of handset 104 during the time period in which controller 105 is attempting to identify the nature of an incoming call. This situation may occur by accident or because the user wishes to answer the telephone to determine if the incoming call is a voice transmission and thereby reduce the delay to which the caller is subjected in determining that the call is not a FAX or modem transmission. In prior art interface systems, lifting the handset during the call identification protocol can lead to an erroneous determination of the type of call, because sounds received by the interface box from the handset are combined with the signals of the incoming telephone call.

In an interface box according to the present invention, if controller 105 detects handset 104 going off-hook during the call identification protocol, controller 105 suspends the identification protocol until the person either replaces handset 104 or a predetermined time interval elapses. During this period, controller 105 causes handset 104 to be connected to line 101. If the user does not replace the handset for this time interval, controller 105 assumes that the incoming call was a voice communication and terminates its operation, since the proper connection has been established.

Whenever any of the devices connected to switch 112 goes off-hook and line 101 is not in use, controller 105 connects the device in question to line 101. If one of the other devices attempts to use the line, controller 105 causes that device to receive a busy signal. As noted above, a telephone handset can assert priority over the line by issuing a sequence of short off-hook pulses.

Figure 4:
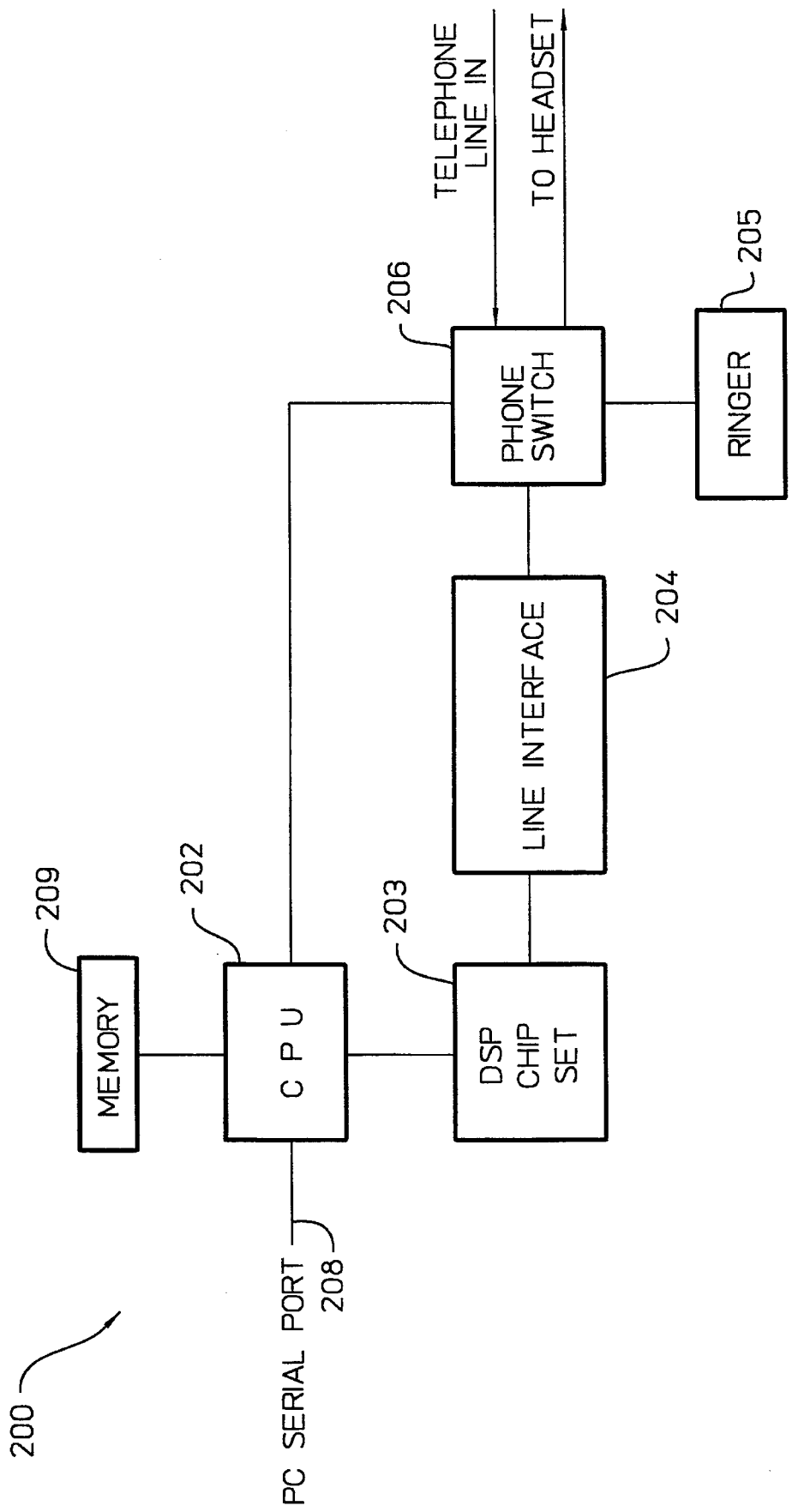
FIG. 4 is a block diagram of the preferred embodiment of the present invention.

While the above described embodiments of the present invention utilized specific function blocks to accomplish goals such as speech detection, speech generation, etc., it will be apparent to those skilled in the art that many of the functions may be generated by a conventional microprocessor and a digital signal processing (DSP) chip set such as the AT&T Data Pump Chip Set. A block diagram of such an embodiment of the present invention is shown in FIG. 4 at 200. This embodiment of the present invention is preferably constructed as a modem card for a personal computer. The FAX and data modem features are implemented with the aid of Chip set 203 and software in the personal computer from interface signals received on a serial port 208. The functions provided by controller 105 are performed by CPU 202 and memory 209 in this embodiment of the present invention. In the preferred embodiment of the present invention, memory 209 includes memory chips that may be programmed in response to signals from serial port 208. DSP chip set 203 provides the auto-dialing, call progress detection, and auto answering features of conventional modems. Chip set 203 also provides modulation protocols, echo cancellation, transmitter and receiver equalizers, and adaptive phase predictor circuitry for enabling modem operations at various baud rates. In addition, chip set 203 provides the A/D-D/A conversions needed to simulate the analog front-end of a modem.

Line interface circuit 204 provides the functions needed to couple the analog signals from chip set 203 to the public switched telephone network. These functions include isolation, 2 to 4 wire conversion, line and instrument off-hook relays, instrument off-hook detection, and ring detection. Ringer 205 provides the circuitry needed to generate the high voltage required to ring a conventional telephone handset.

While the above embodiments of the present invention have been described in terms of FAX machines and modems, it will be apparent to those skilled in the art that a FAX machine may be viewed as a different form of modem. Combination FAX/data modems are becoming increasingly common add-on boards for personal computers. In such systems, the difference between a FAX communication and a data modem communication is handled by firmware or software which implements the different modem protocols needed for the communication mode being used.

Accordingly, an improved telephone line interface apparatus for connecting a telephone line to a handset and another device such as a FAX machine has been described. Various modifications to the present invention will become apparent to those skilled in the art from the foregoing description and accompanying drawings. Accordingly, the present invention is to be limited solely by the scope of the following claims.

What is claimed is:

1. An apparatus for connecting a modem and a telephone handset to a telephone line, said apparatus comprising:

means for coupling said apparatus to said telephone line;

means for coupling said apparatus to said modem;

means for coupling said apparatus to said telephone handset;

switch means, responsive to a switch control signal, for connecting either said telephone handset or said modem to said telephone line;

means for detecting a ring signal on said telephone line;

off-hook detecting means for detecting if said telephone handset is off-hook, said off-hook condition being indicated by an off-hook signal generated by said off-hook detecting means; and control means, responsive to said ring signal detecting means, for determining if a telephone call received on said telephone line is to be directed to said handset or said modem and for generating said switch control signal, wherein said control means further comprises means for detecting a sequence of off-hook signal pulses and wherein said control means terminates any connection between said telephone line and said modem and causes said switch means to couple said telephone handset to said telephone line when said sequence of off-hook signal pulses is detected thereby allowing said telephone handset to be used to initiate a telephone call on said telephone line.

2. The apparatus of claim 1 wherein said control means further comprises:

means for detecting said off-hook signal; and means for interrupting said determination of whether said received telephone call is to be directed to said handset or said modem when said control means detects said off-hook signal.

3. An apparatus for connecting a modem and a telephone handset to a telephone line, said apparatus comprising:

means for coupling said apparatus to said telephone line;

means for coupling said apparatus to said modem;

means for coupling said apparatus to said telephone handset;

switch means, responsive to a switch control signal, for connecting either said telephone handset or said modem to said telephone line;

means for detecting a ring signal on said telephone line, said ring detecting means further comprising means for detecting the cadence of said ring signal;

ring signal generating means for generating and coupling a ring signal to said telephone handset; and control means, responsive to said ring signal detecting means, for determining if a telephone call received on said telephone line is to be directed to said telephone handset or said modem and for generating said switch control signal, said control means further comprising means for causing said ring signal generating means to generate and couple a ring signal to said telephone handset having a cadence the same as that detected by said ring signal detecting means if said control means determines that said telephone call is to be directed to said telephone handset.

\* \* \* \* \*